March 15, 1960     A. O. PITNER     2,928,702
BEARINGS HAVING CYLINDRICAL BEARING ELEMENTS
Filed Nov. 4, 1955     2 Sheets-Sheet 1

Inventor
Alfred Otto Pitner
by Albert L. Frey
Attorney.

March 15, 1960     A. O. PITNER     2,928,702

BEARINGS HAVING CYLINDRICAL BEARING ELEMENTS

Filed Nov. 4, 1955     2 Sheets-Sheet 2

Inventor
Alfred Otto Pitner
by Albert L. Frey
Attorney

# United States Patent Office 2,928,702
Patented Mar. 15, 1960

2,928,702

BEARINGS HAVING CYLINDRICAL BEARING ELEMENTS

Alfred Otto Pitner, Paris, France, assignor, by direct and mesne assignments, of one-half to Société dite: Societe Anonyme des Roulements a Aiguilles, Rueil-Malmaison, France, a French company Application November 4, 1955, Serial No. 545,093

Claims priority, application France November 5, 1954

3 Claims. (Cl. 308—236)

The present invention concerns bearings having cylindrical bearing elements.

In bearings having cylindrical bearing elements in general and, in particular, in roller bearings comprising moving cylindrically shaped elements the diameter of which is small in relation to their length and more especially needle bearing elements, the loading capacities are such that, in cases where the bearing support, i.e. the shaft or axle on which the bearing is to be used, does not have the qualities required for its operation, such qualities as necessary hardness or finish, an inner ring of solid steel and provided with the inner bearing race must be mounted on this support.

In order to comply with the requirements of present day technique, it is preferable that a bearing of this nature should have a radial size as small as possible and, consequently, this inner ring should itself be reduced to a minimum thickness.

The present invention concerns the construction of bearings having an inner ring of less thickness than that of the rings constructed until to-day.

The invention has also the great advantage to reduce substantially the usual radial size of the bearing.

According to the present invention there is provided a bearing including cylindrical bearing elements, their diameters being small in relation to their length, for example, needle bearing elements, the inner bearing ring being constituted by a metal sleeve mounted on a support, in which the sleeve is in one piece and has distinct portions or zones, one, at least, of which is circular and forms an inner bearing race whilst another, at least, is attached directly by force mounting on the support.

In such a bearing at least one portion of the sleeve forming the bearing race may have a bore of diameter greater than that of the smallest internal diameter of the mounting portions of the sleeve.

The sleeve forming the inner bearing race and the mounting portion or portions may be formed by: (a) cold worked sheet metal, or (b) the cutting to size of a cold drawn steel tube, subsequently shaped to various diameters to form the different axial zones or portions.

The bearing may also comprise at least one of the following features:

(a) The hardness of any portion or zone of the sleeve forming an inner bearing race is greater than that of the mounting portion or portions of the sleeve; this greater hardness of any part of the sleeve used as the inner bearing race may be obtained by any known hardening process.

(b) The sleeve may have a zone of lesser hardness interposed between a zone or portion having a great hardness and forming an inner bearing race and the mounting portion of the sleeve.

(c) At least the greater internal diameter portion of the sleeve used as a bearing race may be formed by a local tempering process producing its diametrical extension.

(d) Any portion of the sleeve forming the bearing race and the portion or portions of the sleeve used for mounting purposes may be substantially equal in thickness.

(e) A zone of less thickness may be provided between any portion of the sleeve forming an inner bearing race and a portion of the sleeve used for mounting purposes.

(f) The thickness of the wall of the inner bearing race may be smaller than the diameter of the needles.

(g) An outer bearing race, co-operating with the inner bearing race, may be of steel and may have a thickness substantially equal to that of the inner race.

(h) The sleeve may comprise at least two mounting portions one disposed on either side of the portion forming the inner bearing race.

(i) A bearing race portion of the sleeve may be so located on one side of a mounting portion that it overhangs relative to this latter.

(j) The sleeve may comprise a plurality of portions forming inner bearing races, each being interposed with attachment portions.

(k) At least one attachment portion of the sleeve may have: ($\alpha$) a continuous peripheral surface; ($\beta$) a discontinuous peripheral surface.

(l) At least one portion of the sleeve forming the inner bearing race may have, before the mounting of the sleeve to its support, a bore of greater diameter than that of at least one mounting portion of the sleeve and, after mounting on the support by force fitting of this latter portion, the annular space, existing between the portion of the sleeve forming the inner bearing race and the sleeve support being subsequently filled with a media, for example, a plastic material to reduce the deformation of the sleeve under load.

(m) At least one portion of the sleeve forming the inner bearing race may have, before the mounting of the sleeve to its support, a bore of slightly greater diameter than that of the attachment portion of the sleeve and, the difference between the two diameters being such that, once mounted on the support, the bearing race portion of the sleeve contacts the support under a pressure which is less than that of the mounting portion of the sleeve.

(n) The inner bearing race portion of the sleeve may be convex outwardly towards the cylindrical bearing elements.

(o) In a bearing as defined under (n) the portions of the bearing race adjacent to its central portion and which have inner and outer diameters less than those of this central portion may be closed or tightened on to the sleeve support.

(p) At least one mounting portion of the sleeve may have various bore diameters of which, for example, one part only is smaller than the bore of the portion of the sleeve forming the inner bearing race.

Finally, the invention includes any mechanical device comprising the type of bearing defined above.

The invention will be described further by way of example with reference to the accompanying drawings, in which.

In the figures like reference numerals denote like parts.

Figure 1:
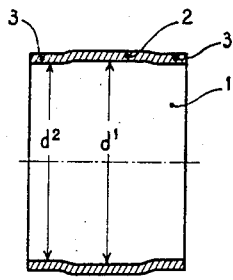
Fig. 1 is a longitudinal section of a bearing sleeve constructed in accordance with the invention.

In Fig. 1, an inner bearing race 1 comprises a sleeve formed, for example, by cold working of sheet steel, by the cutting to size of a cold drawn steel tube, or by any other method, the tubular part thus obtained subsequently being shaped to various diameters.

Figure 2:
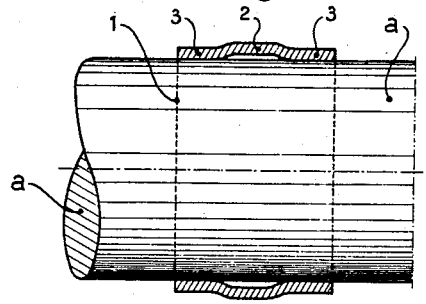
Fig. 2 is the sleeve shown in Fig. 1 mounted on a support.

A centre portion 2 of the sleeve 1, which carries a bearing race, has a bore $d^1$ of greater diameter than bores $d^2$ of adjacent outer portions 3, 3, of the sleeve 1, which portions 3, 3 are provided for mounting purposes, and retain the sleeve by direct contact with its supports; in this instance the sleeve is a force fit on a shaft $a$ (Fig. 2). The hardness of the outer surface of the centre portion 2 of the sleeve used as the inner bearing race is greater than that of the adjacent portions 3, 3. The diameter of shaft $a$ (Fig. 2) is greater than the diameter $d^2$ of the bores of the portions 3, 3 by an amount sufficient to ensure effective securing of the sleeve on the shaft. The sleeve 1 has a substantially uniform thickness both in its central portion 2, forming the inner bearing race, and in its outer attaching portions 3, 3.

It is possible to regulate the hardness and malleability of the various portions of the sleeve in such manner that, when the sleeve is fitted on to its support, the portion 2 carrying the bearing race does not expand or only expands to a slight extent, the amount of this expansion being substantially less than that of the attaching portions 3, 3.

It is also possible to impart values to the hardening of the portion 2 forming the inner bearing race and to the lesser hardening of the mounting portions 3, 3 which do not permit or render inappreciable, the deformation of the portion 2 relative to the mounting portions 3, 3.

Figure 3:
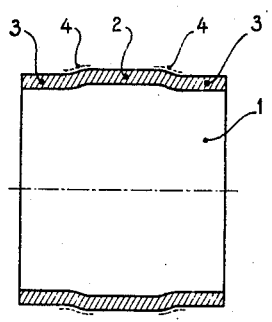
Fig. 3 is a longitudinal section of modified type of bearing sleeve.

In Fig. 3, the central portion 2, forming the inner bearing race, is of greater hardness and is separated from the outer portion 3, 3 by zones, indicated by broken lines 4, 4, of lesser hardness; the outer portions 3, 3, have a hardness suitable for their use in ensuring the hold of the sleeve on its support.

Figure 4:
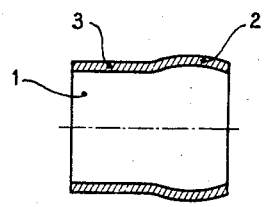
Fig. 4 is a longitudinal section of a sleeve, having an overhanging bearing race.

The portion 2 forming the inner bearing race may, if required, be arranged at one side of the mounting portion 3 as shown in Fig. 4.

Figure 5:
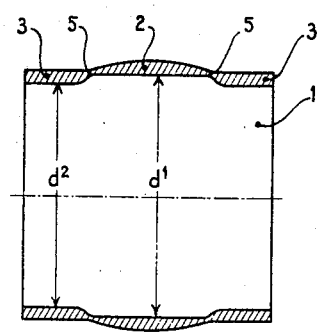
Fig. 5 is a longitudinal section of a sleeve, being a variation of those shown in Figs. 1 to 3.

In Figs. 1 to 4 the thickness of the sleeve is substantially uniform both in its central portion 2, forming the inner bearing race, and in its outer mounting portions 3, 3. In Fig. 5, however, the central portion 2 is separated by zones 5, 5 of reduced thickness from its adjacent mounting portions 3, 3. This formation of the sleeve assists in preventing deformation of the central portion 2, forming the inner bearing race, during force mounting of the portions 3, 3, on the support.

Figure 6:
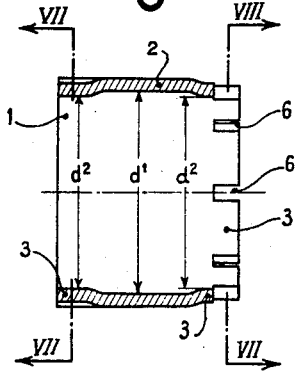
Fig. 6 is a longitudinal section of a further type of sleeve.
Figure 7:
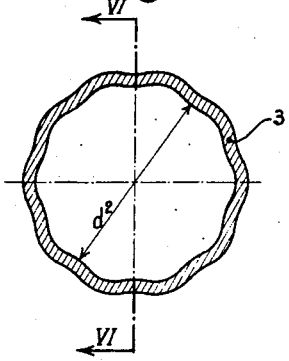
Fig. 7 is a transverse section taken on the line VII—VII of Fig. 6.
Figure 8:
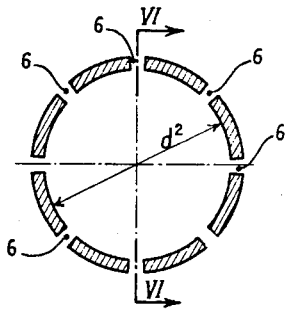
Fig. 8 is a transverse section taken on the line VIII—VIII of Fig. 6.

In Fig. 6, the sleeve 1 has a central portion 2 of internal diameter $d^1$, forming an inner bearing race, located between two outer portions 3, 3 of lesser internal diameters $d^2$. In Fig. 7, the cross-section on the line VII—VII of Fig. 6 shows a corrugated mounting portion 3, the smallest internal diameter $d^2$ of which is less than the internal diameter $d^1$ of the central portion 2. In Fig. 8, the cross-section on the line VIII—VIII of Fig. 6 shows a mounting portion 3 having a discontinuous surface of internal diameter $d^2$ which is less than the internal diameter $d^1$ of the central portion 2. This discontinuity may, for example, be formed by longitudinal slots 6 made for the purpose of increasing the elasticity of the attaching portion 3.

Figure 9:
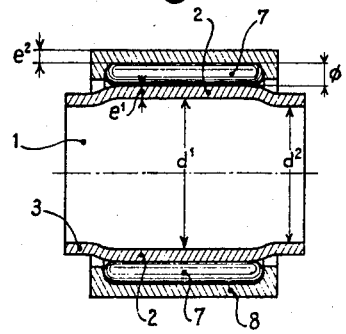
Fig. 9 is a longitudinal section of a complete bearing.

A longitudinal cross-section of a complete bearing is shown in Fig. 9. Needles 7, 7, have a diameter $\phi$ visibly greater than the thickness $e^1$ of the central portion 2 of the sleeve 1 forming the inner bearing ring; an outer bearing ring 8, of shaped sheet metal, has a thickness $e^2$ which is substantially the same thickness as that of the inner ring 1.

Figure 10:
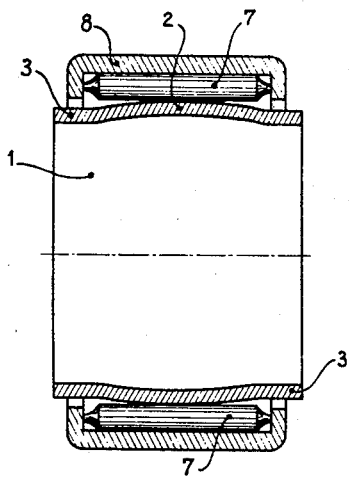
Fig. 10 is a longitudinal section of a bearing the inner bearing race of which is convex towards the needles.

In the embodiment shown in Fig. 10, the central portion 2, forming the inner bearing race of the sleeve 1, is convex towards the needles 7, 7.

Figure 11:
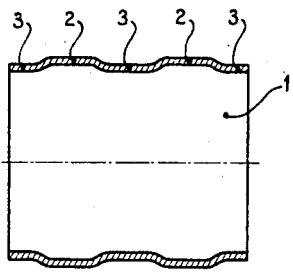
Fig. 11 is a longitudinal section of a sleeve having two bearing races.

In the embodiment shown in Fig. 11, the sleeve 1 has two central portions forming two bearing races 2, 2 separated from each other by a zone 3 of smaller internal diameter, being similar to the internal diameter of the two outer portions 3, 3.

What I claim is:

1. In combination with a shaft, a needle bearing embodying an inner race ring consisting of an integral solid sleeve of a thickness smaller than the diameter of the needles and comprising a mounting sleeve portion having substantial elongation characteristics and an initial inner diameter less than the shaft diameter to provide a force fit of said mounting sleeve portion on said shaft and an axially adjoining race portion, having an axial length coextensive with the length of the needles, an inner diameter larger than the shaft diameter and a hardened outer surface of precalibrated sectional outline and radial dimensions forming the raceway for the needles, said outline and radial dimensions being unaffected by the expansion of the adjacent force-fitted mounting portion.

2. The combination claimed in claim 1, wherein the thickness of said sleeve in the region intermediate between said mounting portion and said race portion is less than the thickness of said mounting and race portions.

3. In a bearing including cylindrical bearing elements the diameter of which is small in relation to their length, an inner bearing ring constituted by a metal sleeve mounted on a support, said inner bearing ring being in one piece and having distinct portions, one at least of which is circular in cross section and forms an inner bearing race whilst another, at least, of a smaller internal diameter, is mounted directly by force on the support, and at least one portion of the sleeve forming the inner bearing race has, before the mounting of said sleeve to its support, a bore of greater diameter than that of at least one mounting portion of said sleeve and, after mounting on the support by force fitting of this latter portion, and the annular space existing between the portion of the sleeve forming the inner bearing race and the sleeve support being subsequently filled with a plastic material to reduce the deformation of the sleeve under load.

References Cited in the file of this patent

UNITED STATES PATENTS

| | | |
|---|---|---|
| 1,985,693 | Robinson | Dec. 25, 1934 |
| 1,998,735 | Rasmussen | Apr. 23, 1935 |
| 2,001,675 | Eisgruber | May 14, 1935 |
| 2,038,475 | Brown | Apr. 21, 1936 |
| 2,259,324 | Robinson | Oct. 14, 1941 |

FOREIGN PATENTS

| | | |
|---|---|---|
| 408,283 | France | Mar. 23, 1910 |
| 803,179 | France | June 29, 1936 |